(12) United States Patent
Wanami et al.

(10) Patent No.: US 6,831,565 B2
(45) Date of Patent: Dec. 14, 2004

(54) SEAT OCCUPATION JUDGING APPARATUS FOR A VEHICLE

(75) Inventors: Shingo Wanami, Kariya (JP); Hiroyuki Ito, Chita (JP); Takashi Inoue, Kariya (JP); Tetsuya Takafuji, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/241,436

(22) Filed: Sep. 12, 2002

(65) Prior Publication Data

US 2003/0047983 A1 Mar. 13, 2003

(30) Foreign Application Priority Data

Sep. 13, 2001 (JP) ........................................ 2001-277671

(51) Int. Cl.⁷ .................... G08B 21/00; A47C 7/62; A47D 1/10
(52) U.S. Cl. .................... 340/667; 340/666; 297/217.3; 297/217.4; 297/250.1
(58) Field of Search ................................. 340/666, 667, 340/668; 297/217.3, 217.4, 250.1, 180.12, 180.1

(56) References Cited

U.S. PATENT DOCUMENTS

| | | | | |
|---|---|---|---|---|
| 5,618,056 A | * | 4/1997 | Schoos et al. | 340/667 X |
| 5,678,854 A | * | 10/1997 | Meister et al. | 340/667 X |
| 5,798,703 A | * | 8/1998 | Sakai et al. | 340/666 |
| 5,838,233 A | * | 11/1998 | Hawes et al. | 340/572 |
| 6,005,485 A | * | 12/1999 | Kursawe et al. | 340/666 X |
| 6,043,736 A | * | 3/2000 | Sawahata et al. | 340/667 X |
| 6,179,378 B1 | * | 1/2001 | Baumgartner et al. | 297/180.12 |
| 6,283,504 B1 | * | 9/2001 | Stanley et al. | 340/562 X |
| 6,288,649 B1 | * | 9/2001 | Wolfe | 340/666 X |
| 6,348,663 B1 | * | 2/2002 | Schoos et al. | 340/667 X |
| 6,392,542 B1 | * | 5/2002 | Stanley | 340/562 X |
| 6,522,257 B1 | * | 2/2003 | Jakob et al. | 340/667 X |
| 6,563,231 B1 | * | 5/2003 | Stanley et al. | 307/10.1 |
| 6,563,429 B2 | * | 5/2003 | Sakai et al. | 340/666 X |
| 6,567,732 B2 | * | 5/2003 | Drobny et al. | 340/667 X |
| 6,577,023 B1 | * | 6/2003 | Stanley et al. | 307/10.1 |
| 6,661,341 B2 | * | 12/2003 | Masuda et al. | 340/562 |
| 2001/0042412 A1 | * | 11/2001 | Serban et al. | 340/667 X |
| 2002/0053980 A1 | * | 5/2002 | Masuda et al. | 340/667 |
| 2003/0009273 A1 | * | 1/2003 | Stanley et al. | 340/667 X |

FOREIGN PATENT DOCUMENTS

| | | |
|---|---|---|
| JP | 10-319133 | 12/1998 |
| JP | 11-11256 | 1/1999 |
| JP | 2000-301980 | 10/2000 |

* cited by examiner

Primary Examiner—Rodney B. White
(74) Attorney, Agent, or Firm—Posz & Bethards, PLC

(57) ABSTRACT

A seat occupation is judged with a load detector arranged at a seat for detecting a load on the seat and a seat condition detection means arranged at the seat for providing discrimination between an adult and a child seat on the seat. A judging means judges that a child seat is set on the seat when the load detection means detects the load corresponding to that of adult and the seat condition detection means detects that the child seat on the seat. The seat condition detection means may comprise an electrostatistic sensor for detecting a capacitance that is increased by the body of the passenger or a pressure detection element array arranged on the sitting portion. The detected capacitance or the pressure distribution is different between a child seat and an adult or a passenger.

16 Claims, 6 Drawing Sheets

SEAT OCCUPATION JUDGING APPARATUS FOR A VEHICLE

BACKGROUND OF THE INVENTION

1. Field of the Invention

This invention relates to a seat occupation judging apparatus for a vehicle.

2. Description of the Prior Art

Crew detection sensors for detecting a crew are known. The crew detection sensor is used for determining to operate a crew protection device such as an airbag or a seatbelt pre-tensioner for protecting a passenger on the assistant driver's seat on crash.

As crew detection sensors, load sensors including a strain gage attached to a seat frame have been proposed. Crews are classified on the basis of difference in weight of crews represented by an output signal of the sensors.

Japanese patent application provisional publication No. 2000-301980 discloses such a judging technique with a sensor for detecting load distribution at a seat. Crews are judged to be either of an adult or a child on the basis of the detected load distribution at the seat.

Japanese patent application provisional publication Nos. 10-319133 and 11-11256 disclose techniques for judging the presence of a crew on a seat on the basis of variation in capacitance utilizing the effect that the passenger is a conductor.

However, if judgment is made as to whether a crew is present or as to discrimination between an adult and a child with the load sensor, a child seat strongly fasten to the seat with the seatbelt may cause an erroneous judgment such that an adult sits on the seat because of a great load on the load sensor.

Thus, it is required to provide a seat occupation judging apparatus for a vehicle capable of discrimination between an adult sitting on the seat and a child seat strongly fasten with a seat belt.

SUMMARY OF THE INVENTION

The aim of the present invention is to provide a superior seat occupation judging apparatus.

According to the present invention, a first aspect of the present invention provides a seat occupation judging apparatus for a vehicle comprising:

- load detection means arranged at a seat for detecting a load on said seat to output a load detection signal;
- seat condition detection means arranged at said seat for detecting a seat condition to generate a seat condition detection signal indicative of discrimination in presence on said seat between an adult and a child seat on said seat; and
- judging means responsive to said load detection means and said seat condition detection means for outputting a judging signal indicating that a child seat is set on the seat when said load detection signal indicates that an adult sits on said seat and said seat condition detection signal indicates that said child seat set on said seat.

According to the present invention, a second aspect of the present invention provides a seat occupation judging apparatus based on the first aspect, wherein said seat condition detection means comprises a statistic field sensor including: a transmission electrode arranged in said seat in an outer layer, touchable to a seat occupation, of said seat; an alternative current source for supplying an alternative current to said transmission electrode; a capacitance detection circuit for detecting an electrostatistic capacitance provided by said transmission electrode with said alternative current and generating a seat condition detection result as said seat condition detection signal on the basis of said detected capacitance.

According to the present invention, a third aspect of the present invention provides a seat occupation judging apparatus based on the second aspect, wherein said transmission electrode is arranged at a first portion of said seat, said statistic field sensor further comprising a receiving electrode arranged in an outer layer touchable to said seat occupation at a second different portion of said seat for receiving a voltage induced by said transmission electrode and said alternative current; a capacitance variation detection circuit for detecting variation in capacitance provided by said transmission electrode and said receiving electrode with said alternative current and outputting another seat condition detection result indicating that an adult sits on said seat.

According to the present invention, a fourth aspect of the present invention provides a seat occupation judging apparatus based on the third aspect, wherein said judging means judges that said seat condition detection signal indicates that said seat occupation is an adult from a logical OR operation between said seat condition detection result and said another seat condition detection result.

According to the present invention, a fifth aspect of the present invention provides a seat occupation judging apparatus based on the second aspect, wherein said seat includes a sitting portion and a seat back, said sitting portion has a seat heater therein, said transmission electrode is arranged between a surface touchable to said seat occupation and said seat heater, of said sitting portion.

According to the present invention, a sixth aspect of the present invention provides a seat occupation judging apparatus based on the third aspect, wherein said seat includes a sitting portion and a seat back, said seat back has a seat heater therein, and said receiving electrode is arranged between a surface touchable to said seat occupation and said seat heater, of said seat back.

According to the present invention, a seventh aspect of the present invention provides a seat occupation judging apparatus based on the fifth aspect, further comprising an electrical conductive film with a high impedance condition between said seat heater of said sitting portion and said transmission electrode.

According to the present invention, an eighth aspect of the present invention provides a seat occupation judging apparatus based on the sixth aspect, further comprising a conductive film with a high impedance condition between said seat heater of said seat back and said receiving electrode.

According to the present invention, a ninth aspect of the present invention provides a seat occupation judging apparatus based on the first aspect, wherein said seat condition detection means comprises a planar pressure sensor array arranged in a sitting portion of said seat along a surface, touchable to said seat occupation, of said sitting portion including pressure sensing elements two-dimensionally arranged with a predetermined pattern.

According to the present invention, a tenth aspect of the present invention provides a seat occupation judging apparatus based on the ninth aspect, wherein said judging means analyzes a pressure pattern in a with direction of said seat and judges that said seat occupation is a person including an adult and a child when said analyzed pressure pattern has two peaks.

According to the present invention, an eleventh aspect of the present invention provides a seat occupation judging apparatus based on the ninth aspect, wherein a distance between centers of the leftmost and rightmost pressure elements in width direction is from 200 mm to 250 mm and a distance between centers, in the backward and forward direction of said sitting portion, of pressure elements at the front end of said sitting portion and the rear end of said sitting portion is from 70 mm to 130 mm.

According to the present invention, a twelfth aspect of the present invention provides a seat occupation judging apparatus based on the ninth aspect, wherein said array includes three to ten rows of said pressure elements arranged in said backward and forward direction of said sitting portion and five to twelve lines of pressure elements arranged in the width direction of said sitting portion at a predetermined interval.

According to the present invention, a thirteenth aspect of the present invention provides a seat occupation judging apparatus based on the twelfth aspect, wherein said array includes five line of said pressure elements arranged in said width direction, said pressure elements at a center one of said five line are arranged in a center line of said sitting portion in said width direction, and intermediate lines out of said five lines between the rightmost and leftmost ones of said five lines and said center one of said five lines are arranged closer to the rightmost and left most ones than said center one, respectively.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

[First Embodiment]

Figure 1:
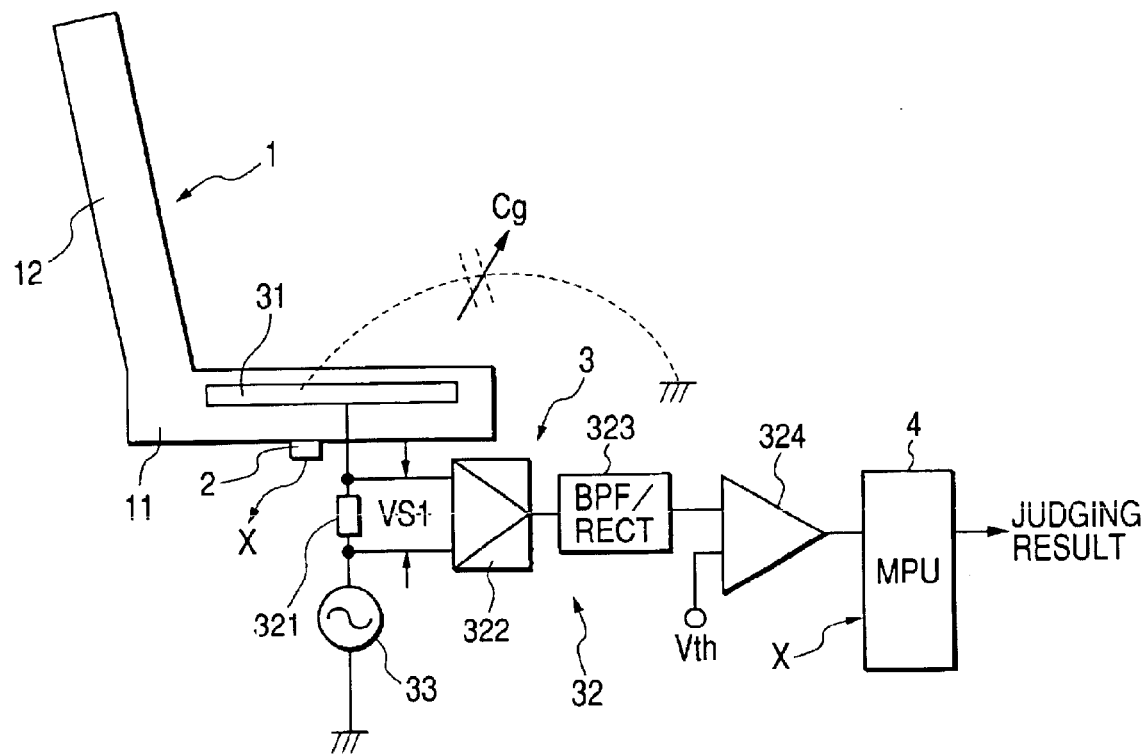
FIG. 1 illustrates a seat occupation judging apparatus for a vehicle according to a first embodiment.

FIG. 1 illustrates a seat occupation judging apparatus for a vehicle according to a first embodiment. It comprises a load sensor 2 attached to the seat 1 for measuring a weight load on the seat 1, an electrostatistic sensor 3 as a seat condition detection means for detecting variation in capacitance to detect the seat occupation condition, and a microprocessor 4 for judgment.

The seat 1 includes a sitting portion 11 and a seat back 12. The load sensor 2 comprises a capacitive sensor or a strain gage sensor for detecting a weight load on the seat 1 to supply a load detection signal to the microprocessor 4.

The electrostatistic sensor 3 comprises a transmission electrode 31, a detection circuit 32, and an ac signal source 33. The transmission electrode 31 comprises a sheet of electrode arranged at an outer layer of the sitting portion 11 touchable to a seat occupation. The detection circuit 32 includes a resistive element 321 for detecting a voltage drop VS1 across the resistive element 321, a voltage amplifier 322, a band pass filter/rectifier 323, and a comparator 324. The ac signal source 33 generates an ac voltage (current) of a predetermined frequency to supply it to the transmission electrode 31 through the resistive element 321.

Figure 3:
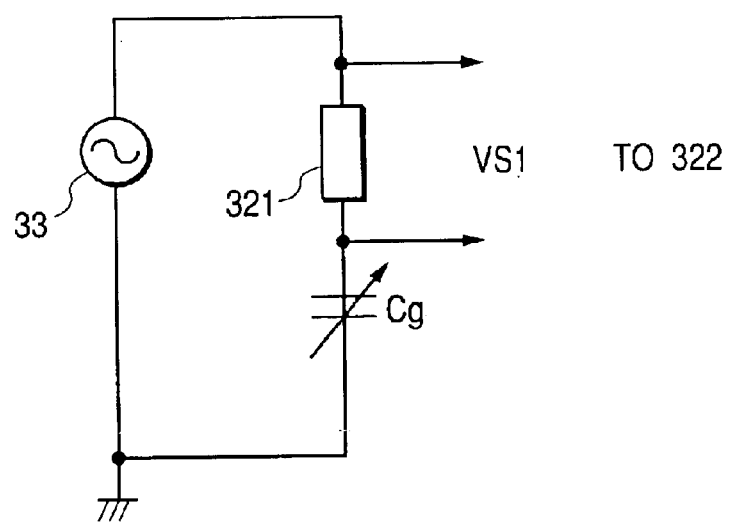
FIG. 3 illustrates an electric equivalent circuit diagram according to the first embodiment.

When a person sits on the seat 1, the body is considered substantially as a conductor, and thus, the stray capacitance Cg between the transmission electrode 31 and the ground (the body of the vehicle) largely increases. As shown the equivalent circuit of the electrostatistic sensor 3 in FIG. 3, increase in the stray capacitance Cg results in decrease in ac impedance of the stray capacitance Cg. This increases the voltage drop VS1 across the resistive element 321. The voltage amplifier 322 amplifies the voltage drop VS1. The band pass filter/rectifier 323 includes a band pass filter and a rectifying circuit. The band pass filter in the band pass filter/rectifier 323 extracts the predetermined frequency component corresponding to the predetermined frequency of the ac voltage, and the rectifier in the band pass filter/rectifier 323 rectifies the extracted component to output a detection voltage. The comparator 324 compares the detection voltage with a threshold voltage Vth and outputs a logic H level in the case that the seat occupation is an adult and a logic L level in other cases.

Figure 9:
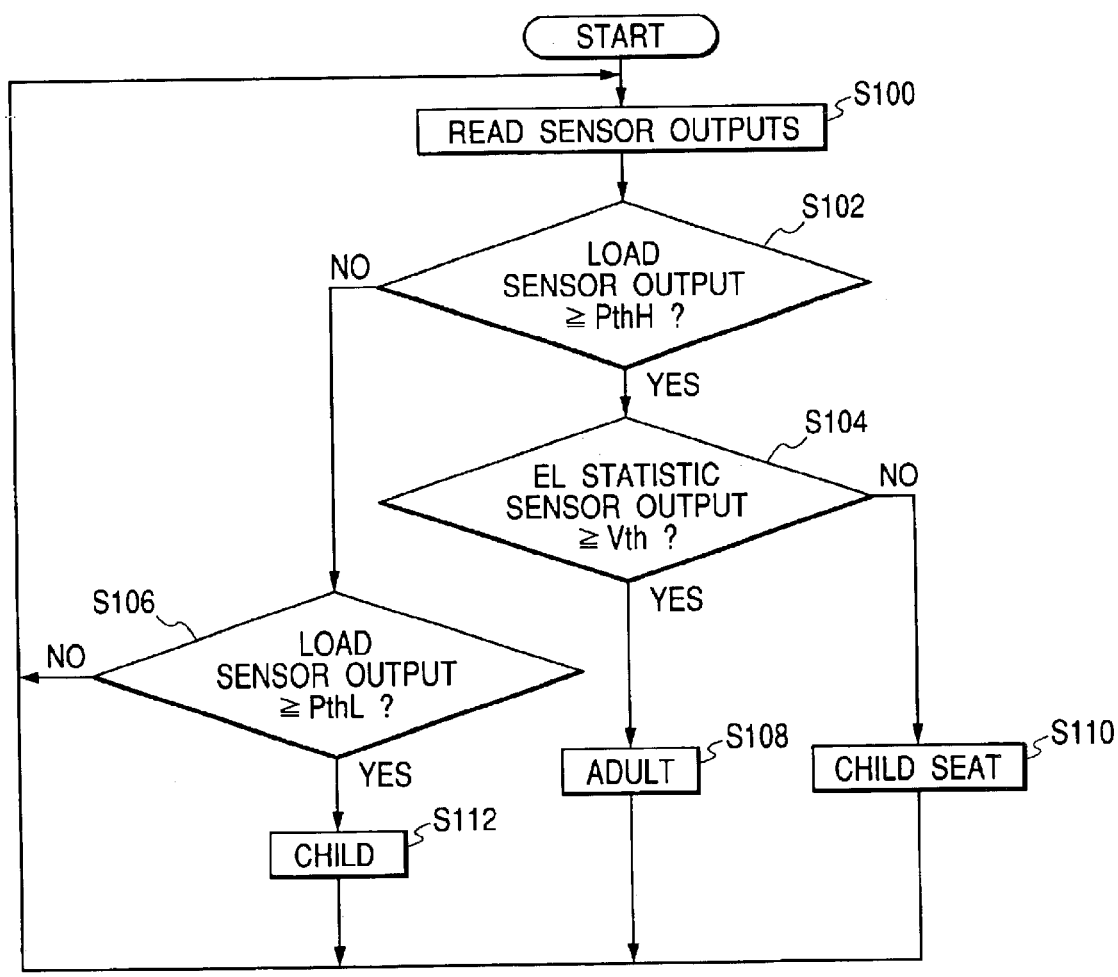
FIG. 9 illustrates a flow chart according to this invention.

The microprocessor 4 operates on the basis of the program stored therein as shown in the flow chart in FIG. 9.

The microprocessor 4 has an A/D converter therein (not shown) and reads the detected load from the load sensor 2 and reads the output level of the comparator 324 from the electrostatistic sensor 3 through an input port of the microprocessor 4 in step S100. Next, the microprocessor 4 judges whether the detected load is equal to or greater than a load threshold value PthH. If the detected load is equal to or greater than the load threshold value PthH, processing proceeds to step S104. If the detected load is less than the load threshold value PthH, processing proceeds to step S106. The load threshold value PthH is provided for discrimination in weight load on the seat 1 between an adult and a child.

In step S104, the microprocessor 4 judges whether the output level of the comparator 324 in the electrostatistic sensor 3 is a logic H (whether the detection signal from the detection circuit 32 is judged to be greater than the predetermined threshold voltage Vth). If the output level is a logic H, processing proceeds to step S108, where the microprocessor 4 outputs a judging result that the seat occupation is an adult. If the output level is a logic L, processing proceeds to step S110, where the microprocessor 4 outputs a judging result that a child seat is attached to the seat 1.

In step S106, the microprocessor 4 judges whether the output of the load sensor 2 is equal to or greater than a predetermined threshold value PthL. If the output of the load sensor 2 is equal to or greater than the predetermined threshold value PthL, processing proceeds to step S112, where the microprocessor 4 outputs a judging result that the seat occupation is a child. If the output of the load sensor 2 is less than the predetermined threshold value PthL, processing returns to step S100 (no seat occupation). The threshold value PthL is provided for discrimination between no seat occupation and a child sitting on the seat.

This operation provides an accurate discrimination judgment between the adult and the child seat on the seat 1 in addition to the discrimination judgment between an adult and a child.

As mentioned above, the seat occupation judging apparatus for a vehicle includes the load sensor 2 arranged at the seat 1 for detecting a weight load on the seat 1 to output a load detection signal, a seat condition detection means arranged at the seat 1 for detecting a seat condition to generate a seat condition detection signal indicative of discrimination in presence on the seat 1 between an adult and a child seat on the seat 1, and the microprocessor 4 responsive to the load sensor 2 and the seat condition detection means for outputting a judging signal (result) indicating that a child seat is set on the seat 1 when the load sensor 2 indicates that an adult sits on the seat 1 and the seat condition detection signal indicates that the child seat sits on the seat 1.

[Second Embodiment]

Figure 2:
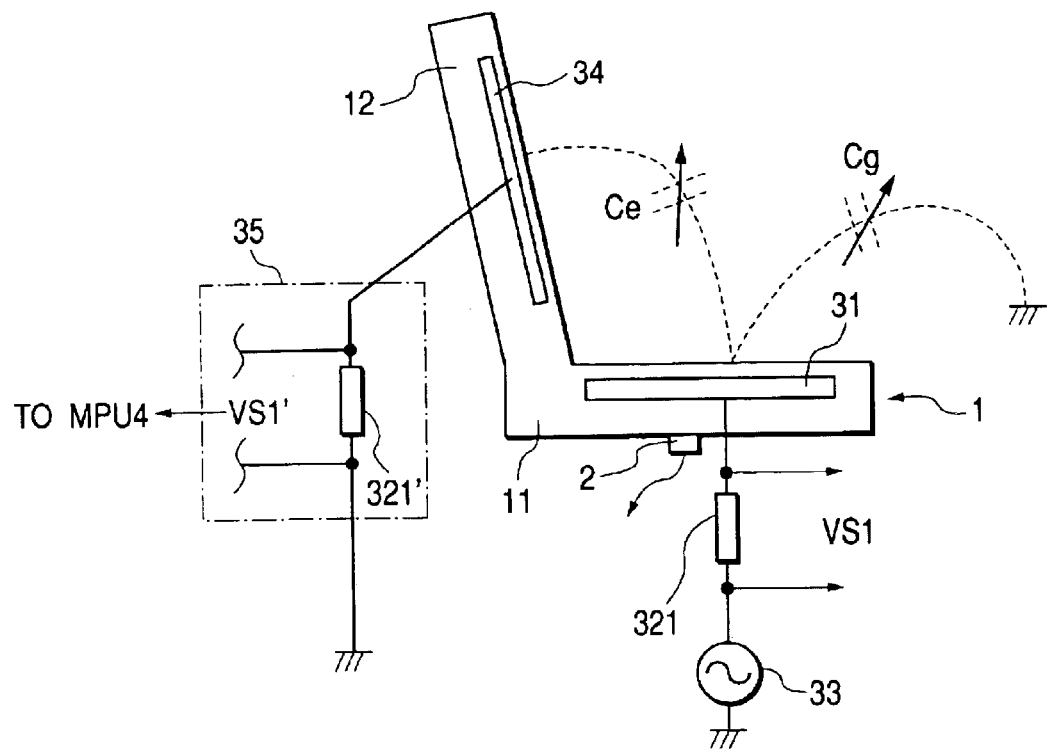
FIG. 2 illustrates a seat occupation judging apparatus for a vehicle according to a second embodiment.

FIG. 2 illustrates a seat occupation judging apparatus for a vehicle according to a second embodiment. The structure of the second embodiment is substantially the same as that of the first embodiment. The difference is in that a receiving electrode is further provided in the seat back 12 and its detection circuit 35 is also further provided.

The receiving electrode 34 comprises a sheet electrode arranged in an outer surface of the seat back touchable to a passenger. The receiving electrode 34 is electrostatically coupled to the transmission electrode 31 to provide a stray capacitance Ce. The output of the receiving electrode 34 is coupled to a first end of a resistive element 321' in the detection circuit 35, the second opposite end of which is grounded. The detection circuit 35 has the same structure as the detection circuit 32. The voltage drop across VS1' the resistive element 321' is similarly processed by the detection circuit 35 and the output of the comparator in the detection circuit 35 is also supplied to the microprocessor 4.

Figure 4:
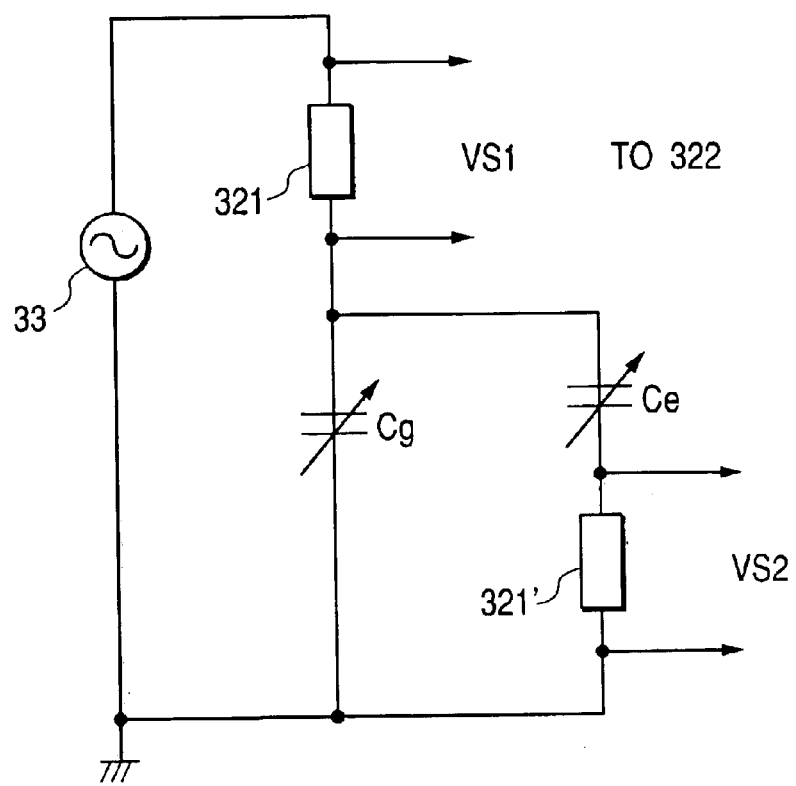
FIG. 4 illustrates an electric equivalent circuit diagram according to the second embodiment.

FIG. 4 shows an equivalent circuit diagram according to the second embodiment.

When a person sits on the seat 1, the stray capacitance Ce between the transmission electrode 31 and the ground (the body of the vehicle) largely increases because the body of the person acts as a conductor. Increase in the stray capacitance Ce results in decrease in ac impedance of the stray capacitance Ce. This increases the voltage drop VS1' across the resistive element 321'. The voltage amplifier in the detection circuit 35 amplifies the voltage drop VS1'. The band pass filter in the detection circuit 35 extracts the predetermined frequency component corresponding to the frequency of the ac voltage (33), and the rectifier in the detection circuit 35 rectifies the extracted component to output a detection voltage. The comparator in the detection circuit 35 compares this detection voltage with a threshold voltage and output a logic H level when the seat occupant is an adult and a logic L level in other cases.

The operation of the microprocessor 4 is substantially same as that of the first embodiment. The difference is in step S104, where the microprocessor 4 judges that the seat occupation is an adult if any of outputs of the detection circuits 32 and 35 outputs a logic H level to provide a redundant judgment, and processing proceeds to step S108.

Figure 10:
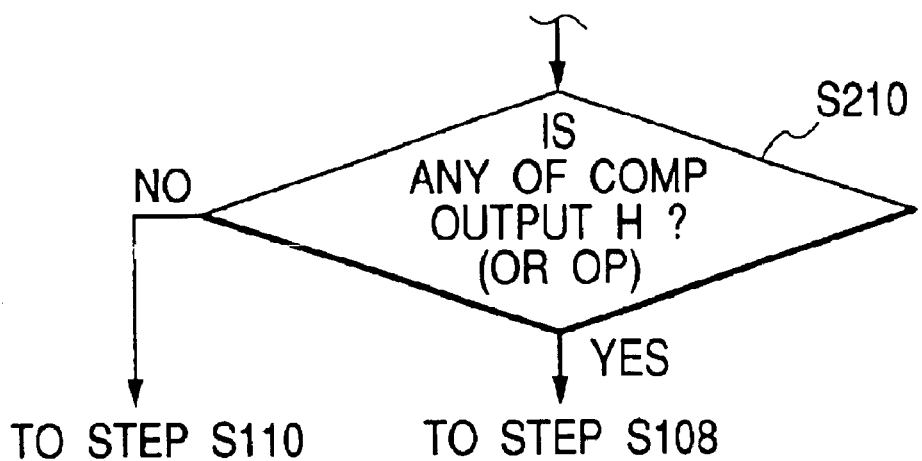
FIG. 10 illustrates a partial operation of the microprocessor according to the second embodiment.

That is, the microprocessor 4 makes a logic-OR operation between the outputs of the detection circuits 32 and 35. FIG. 10 shows this operation, steps S210 replaces the step S104. In step S210, the microprocessor judges whether any of the outputs of the comparators in the detection circuits 32 and 35 is a logic H. If Yes, processing proceeds to step S108. If No, processing proceeds to step S110.

[Third Embodiment]

Figure 5:
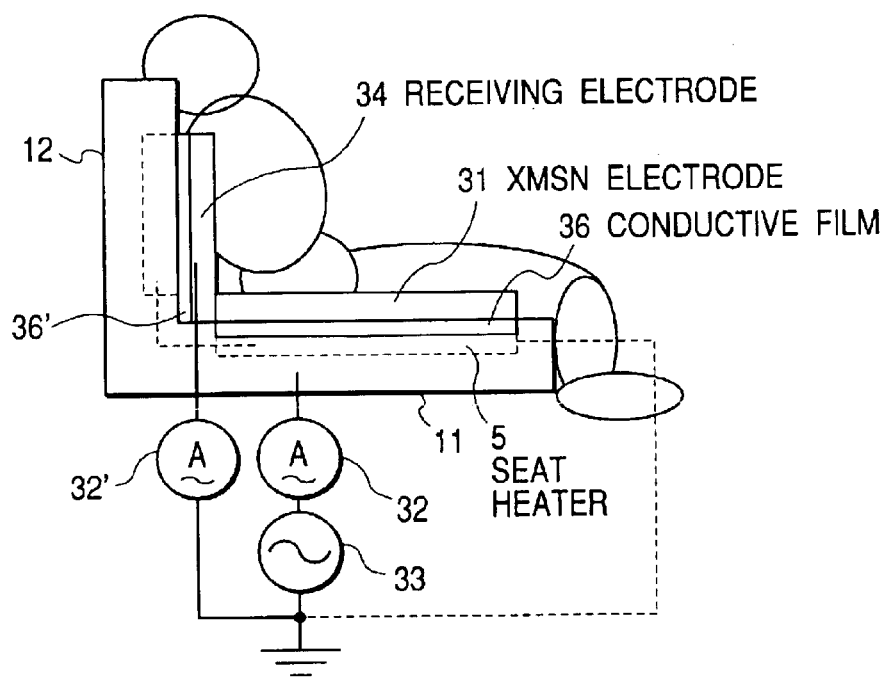
FIG. 5 illustrates a seat occupation judging apparatus for a vehicle according to a third embodiment.

FIG. 5 illustrates a seat occupation judging apparatus for a vehicle according to a third embodiment. The structure of the third embodiment is substantially the same as that of the second embodiment. The difference is in that the sitting portion 11 has a seat heater 5 therein, the transmission electrode 31 is arranged between a surface touchable to a seat occupation and the seat heater 5, of the sitting portion 11, and an electrically conductive film 36 is further provided between the transmission electrode 31 and the seat heater 5. The electrical conductive film 36 which is in electrically floating condition that is, in a high impedance condition is arranged between the seat heater 5 of the sitting portion 11 and the transmission electrode 31 with insulation material thereon and insulation material of the seat 1. This structure reduces the voltage variation in the transmission electrode 31 by the seat heater 5, so that the detection sensitivity of the electrostatistic sensor 3 can be improved. Moreover, this structure prevents the seat heater 5 from electrostatic-shielding the transmission electrode 31. This improves the sensitivity of the electrostatic sensor 3.

Similarly, an electrically conductive film 36' is further provided between the receiving electrode 34 and the seat heater 5 of the seat back 12. The electrical conductive film 36' which is in electrically floating condition that is, in a high impedance condition, is arranged between the seat heater 5 of the seat black 12 and the receiving electrode 34 with insulation material thereon and insulation material of the seat 1.

[Fourth Embodiment]

Figure 6:
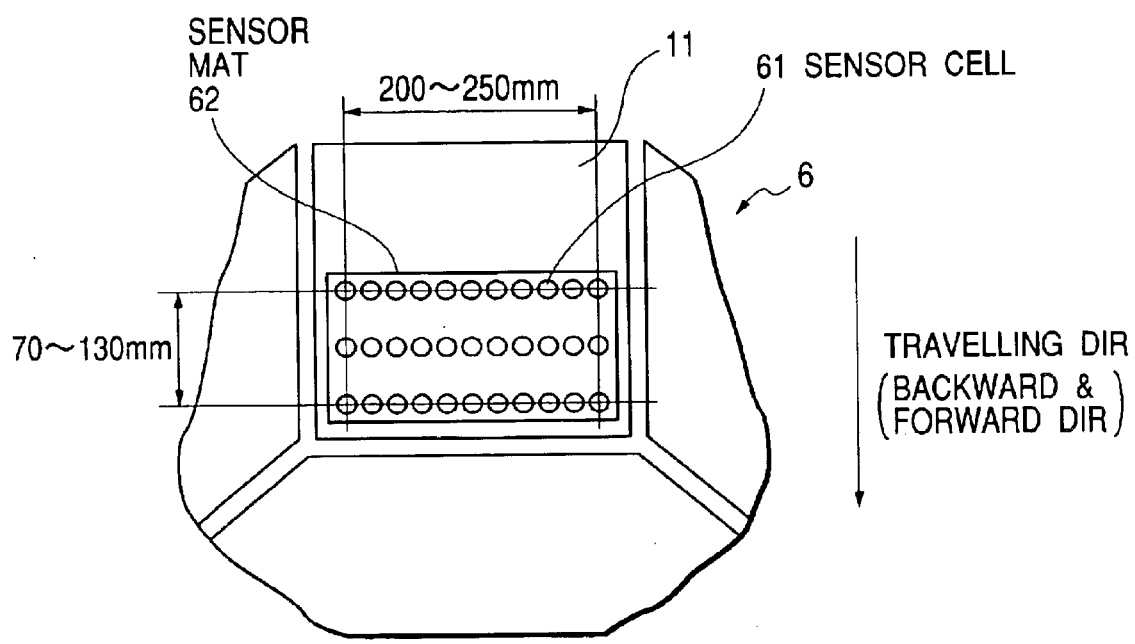
FIG. 6 illustrates a sheet presser sensor according to a fourth embodiment.

FIG. 6 illustrates a sheet presser sensor 6 as a seat condition detection means instead the electrostatic sensor 3. The sheet pressure sensor 6 comprises a planar pressure sensor array arranged in a sitting portion 11 of the seat 1 along a surface, touchable to the seat occupation, of the sitting portion 11 including pressure sensing elements (cells) 61 two-dimensionally arranged with a predetermined pattern. That is, three rows (extending in width direction of the seat 1) and eight lines (extending in backward and forward direction of the seat 1) of sensor elements 61 are arranged. More specifically, the sheet pressure sensor 6 includes an elastic film (sensor mat) 62 having a predetermined electrical resistivity and pairs of electrodes arranged at both surfaces of the sensor mat 62 facing each other through the sensor mat 62 at intervals. Each pair of electrodes detects decrease in electric resistance therebetween when a pressure is applied perpendicularly to the surface of the sensor mat 62. For example, each electrode on one surface of the elastic film 62 supplied with a current through a resistor is successively connected to an A/D converter in the microprocessor 4 through a multiplexer (not shown). The electrodes on the other surface is commonly connected a predetermined potential. The microprocessor 4 successively reads the A/D converted voltage. Thus, the microprocessor 4 inputs sequential binary voltage signals indicative of two-dimensional pressure pattern.

Figure 8:
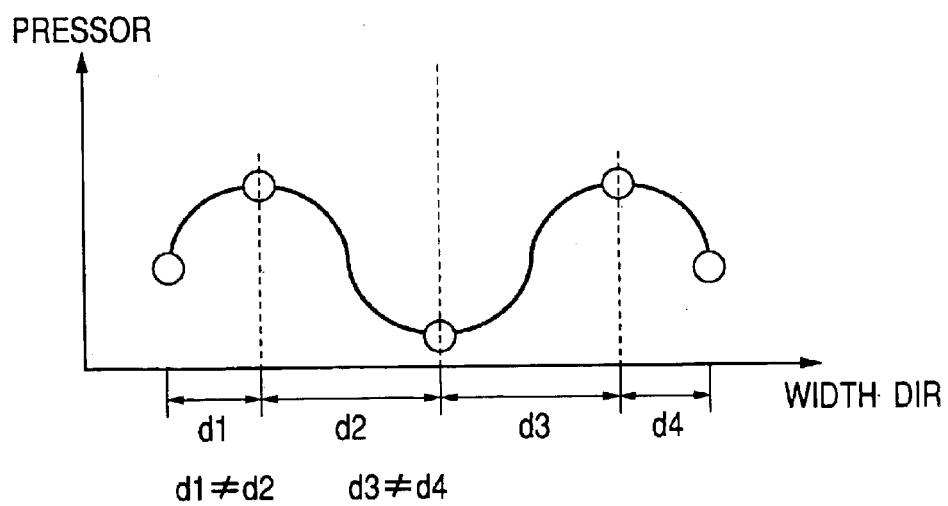
FIG. 8 illustrates a pressure pattern of an adult according to the fourth embodiment.

The microprocessor 4 analyzes the pressure pattern in a with direction of the sitting portion 11 and judges that a seat occupation is a person including an adult and a child when the analyzed pressure pattern has two peaks as shown in FIG. 8. FIG. 8 illustrates the pressure pattern of an adult. This pattern represents pressure distribution developed by two thighbones of a person, particularly, of an adult. This pattern is clearly distinguished from the pressure pattern by a child seat.

Figure 11:
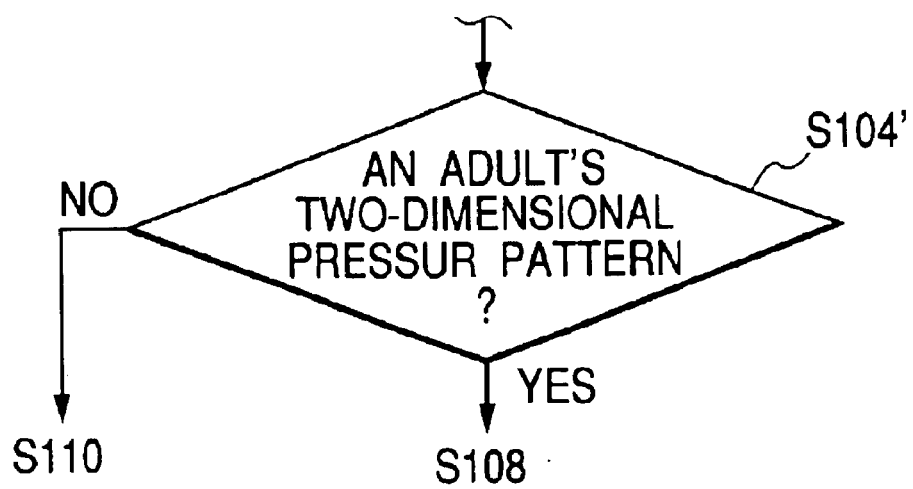
FIG. 11 illustrates a partial operation of the microprocessor according to the fourth embodiment.

The microprocessor 4 basically operates in accordance with the flow chart shown in FIG. 9. The difference is in that step S104' shown in FIG. 11 replaces the step S104.

In step S104', the microprocessor 4 judges whether the detected two-dimensional pressure pattern is of an adult. If Yes, processing proceeds to step S108 and if No, processing proceeds to step S110.

In this sheet pressure sensor, a distance between centers of the leftmost and rightmost pressure elements in width direction is from 200 mm to 250 mm and a distance between centers, in the backward and forward direction of the sitting portion 11, of pressure elements 61 at the front end of the sitting portion 11 and the rear end of the sitting portion is from 70 mm to 130 mm.

An experiment demonstrated this demission is sufficient with a minimum number of the pressure elements 61 in practical use.

Preferably, the array includes three to ten rows of the pressure elements 61 arranged in the backward and forward direction of the sitting portion 11 and five to twelve lines of pressure elements arranged in the width direction of the sitting portion 11 at a predetermined interval.

[Fifth Embodiment]

Figure 7:
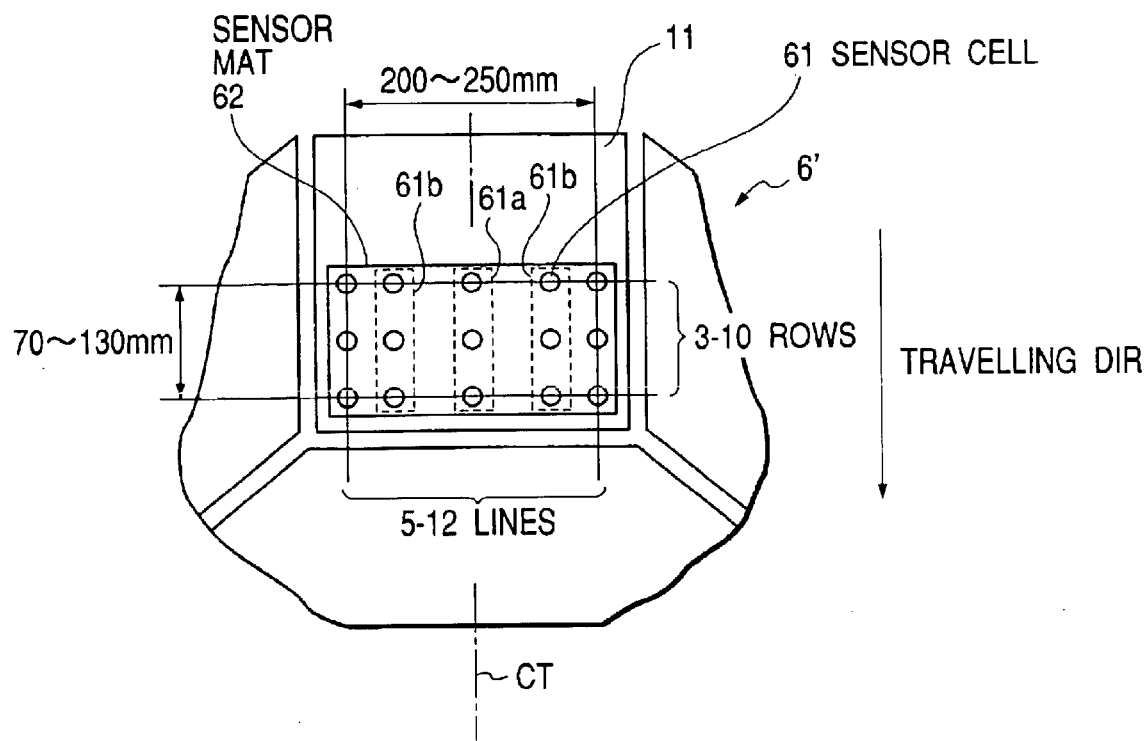
FIG. 7 illustrates another sheet presser sensor according to a fifth embodiment.

FIG. 7 illustrates another sheet presser sensor 6'. In the sheet pressure sensor 6', the array includes five lines of the pressure elements 61 arranged in the width direction. A center of the pressure element 61 of each row is arranged at the center line CT of the sitting portion 11 in the width direction. The pressure sensors 61 between the rightmost and leftmost pressure sensors 61 and the center of the pressure element 61 in this row are arranged closer to the rightmost and leftmost pressure sensors, respectively, than the center of the pressure elements of each row.

In other words, the array includes five lines of the pressure elements arranged in the width direction, the pressure elements 61 at a center one 61a of the five line are arranged in a center line CT of the sitting portion 11 in the width direction, and intermediate lines 61b out of the five lines between the rightmost and leftmost lines and the center line 61a are arranged closer to the rightmost and leftmost lines 61b than the center line 61a, respectively.

This structure provides effective detection with a minimum number of sensor elements with the detection point density around the thighbones being kept sufficient.

What is claimed is:

1. A seat occupation judging apparatus for a vehicle comprising:

load detection means arranged at a seat for detecting a load on said seat to output a load detection signal;

seat condition detection means arranged at said seat for detecting a seat condition to generate a seat condition detection signal indicative of discrimination in presence on said seat between an adult and a child seat on said seat; and judging means responsive to said load detection means and said seat condition detection means for outputting a judging signal indicating that a child seat is set on said seat when said load detection signal indicates that an adult sits on said seat and said seat condition detection signal indicates that said child seat sits on said seat.

2. The seat occupation judging apparatus as claimed in claim 1, wherein said seat condition detection means comprises a statistic field sensor including: a transmission electrode arranged in said seat in an outer layer, touchable to a seat occupation, of said seat; an alternative current source for supplying an alternative current to said transmission electrode; a capacitance detection circuit for detecting an electrostatistic capacitance provided by said transmission electrode with said alternative current and generating a seat condition detection result as said seat condition detection signal on the basis of said detected capacitance.

3. The seat occupation judging apparatus as claimed in claim 2, wherein said transmission electrode is arranged at a first portion of said seat, said statistic field sensor further comprising a receiving electrode arranged in an outer layer touchable to said seat occupation at a second different portion of said seat for receiving a voltage induced by said transmission electrode and said alternative current; a capacitance variation detection circuit for detecting variation in capacitance provided by said transmission electrode and said receiving electrode with said alternative current and outputting another seat condition detection result indicating that an adult is sits on said seat.

4. The seat occupation judging apparatus as claimed in claim 3, wherein said seat includes a sitting portion and a seat back, said seat back has a seat heater therein, and said receiving electrode is arranged between a surface touchable to said seat occupation and said seat heater, of said seat back.

5. The seat occupation judging apparatus as claimed in claim 4, further comprising a conductive film with a high impedance condition between said seat heater of said seat back and said receiving electrode.

6. The seat occupation judging apparatus as claimed in claim 3, wherein said judging means judges that said seat condition detection signal indicates that said seat occupation is an adult from a logical OR operation between said seat condition detection result and said another seat condition detection result.

7. The seat occupation judging apparatus as claimed in claim 2, wherein said seat includes a sitting portion and a seat back, said sitting portion has a seat heater therein, said transmission electrode is arranged between a surface touchable to said seat occupation and said seat heater, of said sitting portion.

8. The seat occupation judging apparatus as claimed in claim 7, further comprising an electrical conductive film with a high impedance condition between said seat heater of said sitting portion and said transmission electrode.

9. The seat occupation judging apparatus as claimed in claim 1, wherein said seat condition detection means comprises a planar pressure sensor array arranged in a sitting portion of said seat along a surface, touchable to said seat occupation, of said sitting portion including pressure sensing elements two-dimensionally arranged with a predetermined pattern.

10. The seat occupation judging apparatus as claimed in claim 9, wherein said judging means analyzes a pressure pattern in a witdh direction of said seat and judges that said seat occupation is a person including an adult and a child when said analyzed pressure pattern has two peaks.

11. The seat occupation judging apparatus as claimed in claim 9, wherein a distance between centers of the leftmost and rightmost pressure elements in width direction is from 200 mm to 250 mm and a distance between centers, in the backward and forward direction of said sitting portion, of pressure elements at the front end of said sitting portion and the rear end of said sitting portion is from 70 mm to 130 mm.

12. A seat occupation judging apparatus for a vehicle comprising:

load detection means arranged at a seat for detecting a load on said seat to output a load detection signal;

seat condition detection means arranged at said seat for detecting a seat condition to generate a seat condition detection signal indicative of discrimination in presence on said seat between an adult and a child seat on said seat; and judging means responsive to said load detection means and said seat condition detection means for outputting a judging signal indicating that a child seat is set on said seat when said load detection signal indicates that an adult sits on said seat and said seat condition detection signal indicates that said child seat sits on said seat, wherein said seat condition detection means comprises a planar pressure sensor array arranged in a sitting portion of said seat along a surface, touchable to said seat occupation, of said sitting portion including pressure sensing elements two-dimensionally arranged with a predetermined pattern, and wherein said array includes three to ten rows of said pressure elements arranged in said backward and forward direction of said sitting portion and five to twelve lines of pressure elements arranged in the width direction of said sitting portion at a predetermined interval.

13. The seat occupation judging apparatus as claimed in claim 12, wherein said array includes five lines of said pressure elements arranged in said width direction, said pressure elements at a center one of said five line are arranged in a center line of said sitting portion in said width direction, and intermediate lines out of said five lines between the rightmost and leftmost ones of said five lines and said center one of said five lines are arranged closer to the rightmost and left most ones than said center one, respectively.

14. A seat occupation judging apparatus for a vehicle comprising:

a load detector arranged at a seat for detecting a load of an occupant on said seat to output a load detection signal;

a seat condition detector arranged at said seat for detecting a seat condition to generate a seat condition detection signal indicative of discrimination in presence on said seat between an adult and a child seat on said seat;

comparing means for comparing a load detection signal with a threshold value to discriminate between a child on said seat and a group including an adult on said seat and a child seat attached on said seat;

first judging means for judging said occupant as a child when a comparison result from said comparing means discriminates said child from said group; and second judging means responsive to said first judging means for judging said occupant on the basis of said seat condition detection signal when said comparing means discriminates said group from a child, and thereby judging said occupant as an adult when said seat condition detection signal indicates presence of an adult on said seat and judging said occupant as a child seat when said seat condition detection signal indicates presence of a child seat on said seat.

15. A seat occupation judging apparatus for a vehicle comprising:

a load detector arranged at a seat for detecting a load of an occupant on said seat to output a load detection signal;

a seat condition detector arranged at said seat for detecting a seat condition to generate a seat condition detection signal indicative of discrimination in presence on said seat between an adult and a child seat on said seat;

comparing means for comparing a load detection signal with a threshold value to discriminate between a child on said seat and a group including an adult on said seat and a child seat attached on said seat;

judging means responsive to said load detection signal, seat condition signal, and said comparing means for judging said occupant as a child when a child is discriminated from said group in accordance with said load detection signal, judging said occupant as an adult when said group is discriminated from a child in accordance with said load detection signal and an adult is discriminate from a child seat in accordance with said seat condition detection signal, and judging said occupant as a child seat when said group is discriminated from a child in accordance with said load detection signal and a child seat is discriminate from an adult in accordance with said seat condition detection signal.

16. A seat occupation judging apparatus as claimed in claim 1, further comprising comparing means for comparing a load detection signal with a threshold value to discriminate between a child on said seat and a group including an adult on said seat and a child seat attached on said seat, wherein said judging means further judges said occupant as a child when a child is discriminated from said group in accordance with said load detection signal and judges said occupant as an adult when said group is discriminated from a child in accordance with said load detection signal and an adult is discriminate from a child seat in accordance with said seat condition detection signal.

* * * * *